Patented July 25, 1939

2,167,094

UNITED STATES PATENT OFFICE 2,167,094

OIL-SOLUBLE RESIN

Victor H. Turkington, Caldwell, and William H. Butler, Palisades Park, N. J., assignors to Bakelite Corporation, New York, N. Y., a corporation of Delaware No Drawing. Application December 11, 1934, Serial No. 757,067

11 Claims. (Cl. 260—19)

This invention relates to phenolic condensation products which are soluble or miscible in fatty oils, such as tung oil, linseed oil, rape seed oil, castor oil and similar oils, as well as compositions including varnishes, paints and the like, containing such condensation products.

The commonly known resinous products obtained from the condensation of phenol or cresol with formaldehyde or its polymers are in general either hard, brittle and insoluble in fatty oils, or are soft low-melting substances which when mixed with oils produce varnishes that do not dry rapidly, where resistance to moisture, alkalies and atmospheric influences is inadequate for commercial requirements. It has been proposed to make the hard phenol and cresol resins soluble in or miscible with fatty oils by fusing them with rosin, but the presence of rosin in general detracts from the desirable properties of the phenolic resinous products in proportion to the relative amount of rosin present.

We have discovered that resinous products which form homogeneous air-drying solutions with drying oils, without the necessity of fusion with rosin or other natural resins, are obtainable from tar acids having a boiling point between 225 and 250° C. by reacting them with suitable amounts of an aldehyde or its equivalent. These tar acids contain essentially the isomeric trimethyl-phenols. The resins of the present invention are not only soluble or miscible in fatty oils, such as tung oil, linseed oil, and other drying and semi-drying vegetable oils, but have in addition an accelerating effect upon the drying of the oil mixtures. The oil-resin compositions rapidly harden when exposed to the air in the form of a film without the application of heat.

The condensation products of the invention are characterized by hardness and high melting points. When incorporated in oils to form coating compositions, a film of the mixture takes a "set" in a very short time and produces a durable film thereafter characterized by resistance to moisture, weak alkalies and weather conditions, and also by toughness, flexibility and adhesiveness.

These phenolic condensation products when incorporated with fatty oils may also be used in the manner customary with synthetic phenolic resins for the manufacture of molding mixtures, and as varnishes for laminated products, or for impregnating various materials, such as fabric, paper, etc. Molded, laminated and impregnated products made in whole or in part from these oil-resin compositions likewise show great resistance to water and alkali and improved electrical properties.

When the previously mentioned tar acids containing principally trimethyl phenols are reacted with an aldehydic or methylene-containing agent the condensation products which are formed contain varying amounts of unreacted phenolic substances, unreacted intermediate products and other undesirable components, the proportion of which depends largely on the time and temperature of the reaction and the relative proportions of the reactants. We have found that these undesirable constituents may be removed by subjecting the condensation products to the action of steam, preferably at temperatures above the melting points of the condensation of the products. The treatment with steam, for example, may be advantageously effected at a temperature of from 180° to 220° C.

The effect of this treatment is to substantially improve the properties of the condensation products in solubility in oil, color and color stability, toughness and durability. These improvements are believed to be due in part to the removal of the above-mentioned undesirable constituents of the untreated condensation products, and in part to alterations in the chemical and/or physical constitution of the condensation products, by the treatment. In general, the condensation products have a higher melting point after being subjected to the described treatment with steam.

The reaction of the phenolic substances with aldehydic substances may be carried out at atmospheric or superatmospheric pressure and acid or alkaline catalysts can be used to assist the reaction. The reaction may be carried out with formaldehyde, its derivatives and polymers, such as hexamethylene tetramine and paraformaldehyde, and with other aldehydes, substituted aldehydes and aldehydic substances such as acetaldehyde, benzaldehyde, furfural, ketones and the like, the conditions of the reaction being adjusted to suit the particular aldehydic substance used. In general from 0.6 to 0.95 mole of aldehydic substance may be used for each mole of phenolic substance, although more than one mole of aldehydic substance may be used if the reaction conditions are made less vigorous, as by shortening the reaction period or reducing the amount of catalyst. When the condensation is complete or nearly complete, it is desirable to heat the reaction product in an open vessel or under a vacuum to about 120° C. or higher to remove unreacted aldehydic substances and volatile reaction products such as water.

The following are illustrative examples of the preparation of the resinous condensation products of the invention:

*Example 1.*—A condensation product is made by reacting together at atmospheric pressure for 2 hours, 100 gms. of tar acids, having a boiling point of between 228 to 235° C. and containing essentially isomers of trimethyl phenol, with 55 gms. of an aqueous solution of 37% $CH_2O$ and 1 gm. of oxalic acid. The product is dehydrated by heating it to 140° C. and has a melting point of 102° C.

*Example 2.*—A condensation product is made by reacting together at atmospheric pressure for 2 hours, 100 gms. of tar acids, having a boiling point between 228 and 235° C. and containing essentially isomers of trimethyl phenol, with 45 gms. of an aqueous solution of 37% $CH_2O$ and 1 gm. of hexamethylene tetramine. The product is dehydrated by heating it to 140° C. and has a melting point of 80° C.

*Example 3.*—A condensation product is made by reacting together at atmospheric pressure for 2½ hours, 100 gms. of tar acids having a boiling point between 233° C. and 240° C. and containing essentially isomers of trimethyl phenol, with 55 gms. of an aqueous solution of 37% $CH_2O$ and 1 gm. of oxalic acid. The product is dehydrated by heating it to a temperature of 140° C. The resin has a melting point of 100° C.

*Example 4.*—A condensation product is made by reacting together at atmospheric pressure for 2½ hours, 100 gms. of tar acids having a boiling point of 238 to 250° C. and containing essentially isomers of trimethyl phenol, with 55 gms. of an aqueous solution of 37% $CH_2O$ and 1 gm. of oxalic acid. The product is dehydrated by heating it to a temperature of 140° C. and has a melting point of 98° C.

*Example 5.*—A condensation product is made by reacting together at atmospheric pressure for a period of 2½ hours, 100 gms. of tar acids having a boiling point between 225 and 250° C. and containing essentially the isomers of trimethyl phenol; with 55 gms. of an aqueous solution of 37% $CH_2O$ and 1 gm. of oxalic acid. The product is dehydrated by heating it to a temperature of 140° C. The resin has a melting point of 100° C.

When the reaction product is to be treated with steam, the reacted mass is preferably heated to approximately 180° C. in a closed vessel fitted with a condenser and receiving tank for the condensate, and steam is blown through the mass for approximately three hours while gradually increasing the temperature, for example from 180° to 230° C. The phenolic bodies and low boiling intermediate products separate from the water condensate, and it is possible to react them with more methylene-containing agent to obtain condensation products. When using a solvent as a treating agent, approximately 200 parts of the solvent, such as xylol, can be mixed with substantially 100 parts of the reacted mass. The mixture is heated and refluxed to substantially complete solution. The solution is then heated to its boiling point and distilled off. The treatment can be carried on at atmospheric or higher pressures or under a vacuum, as desired. The treated condensation products not only have improved general characteristics, but are more easily and completely oil-soluble, have an increased melting point, for example 150° C. or above, and are free from objectionable phenolic odor.

By separating the tar acids into several fractions it is possible to obtain resinous products from the individual fractions which have very high alkali and water resistance. In general, the water and alkali resistance of the condensation products increases with the increase in boiling point of the tar acid fractions selected. The alkali and water resistance of the resinous products therefore can be controlled by fractionating the tar acids into definite fractions and then blending component fractions in predetermined proportions.

The condensation products may be incorporated with fatty oils, for example, by heating a mixture of the condensation product and oil to 200° C. or higher until the solution is completed, and the heating may be continued until the desired viscosity or body is obtained. Metallic driers, such as cobalt linoleate, and thinners, such as turpentine and petroleum distillate and the like, may be incorporated in the usual manner. In general less than the customary amounts are required.

The condensation products of the invention are not only in themselves oil-soluble, but they can be used to some extent as substitutes for the natural resins to render phenol-formaldehyde resins, phthalic anhydride-glycerol resins and the like soluble in oils. Also the condensation products may be mixed with the natural resins, such as rosin, Congo, Dammar and Copal, without an adverse effect on the solubility in oil, although the natural resins detract somewhat from the other desirable qualities of the condensation products by reducing the resistance to weathering and increasing the drying time.

Tung oil is typical of the fatty oils in which the condensation products of the invention are soluble or miscible, but other fatty oils, both nondrying and drying, are also miscible with, or solvents for, these condensation products. Such oils include perilla, cottonseed, soya bean, corn, fish, and other oils in addition to those previously mentioned.

Coating compositions prepared with these synthetic products are characterized by a marked improvement in toughness and durability of the films produced. As little as 1% of these condensation products added to the previously mentioned oils produces a noticeably tougher and more durable film which characteristics are further improved in proportion with the amount of condensation product added. As little as from 5 percent to 10 percent of the resin or solid content of a coating composition greatly increases the resistance of the film to water and alkali. Compositions intended for coatings need not necessarily contain liquids or solvents in addition to the fatty oil nor need they be applied in the form of liquid solutions. The compositions may be applied in a gummy or rubbery condition free from additional liquid by the use of calendering rolls, or similar means, to the surface of fabrics and other materials. The desired condition of the oil and condensation product mixture may be controlled in various ways, for instance by proportioning the condensation product and oil or by bodying the oil.

This invention has been described in connection with trimethyl phenols and tar acids having a boiling point between 225° C. and 250° C. which contain principally these phenols. The trimethyl phenols may be obtained from other sources, however, and homologous trialkyl phenols, such as ethyl dimethyl phenol, methyl di-isopropyl phenol, methyl dipropyl phenol, and methyl isopropyl tertiary amyl phenol may be used in place of the trimethyl phenols.

We claim:

1. A reaction product of a methylene-containing substance and tar acids having a boiling point between 225° and 250° C., substantially free from phenols boiling outside said temperature range, being a resinous product solid at temperatures up to 80° C. and soluble in fatty oils independently of the presence of any component other than said methylene-containing substance and said tar acids.

2. A reaction product of formaldehyde and tar acids having a boiling point between 225° and 250° C., substantially free from phenols boiling outside said temperature range, being a resinous product solid at temperatures up to 80° C. and soluble in fatty oils independently of the presence of any component other than said formaldehyde and said tar acids.

3. A composition of matter comprising a fatty oil and dissolved therein a reaction product of a methylene-containing substance and tar acids having a boiling point between 225° and 250° C., substantially free from phenols boiling outside said temperature range, said reaction product being solid at temperatures up to 80° C. and soluble in fatty oils independently of the presence of any component other than said methylene-containing substance and said tar acids.

4. A method of making an oil-soluble phenolic resin which comprises reacting a methylene-containing substance with tar acids having a boiling point between 225° and 250° C., substantially free from phenols boiling outside said temperature range to produce a resinous product solid at temperatures up to 80° C. and soluble in fatty oils independently of the presence of any component other than said methylene-containing substance and said tar acids.

5. A method of making an oil-soluble phenolic resin which comprises reacting formaldehyde with tar acids having a boiling point between 225° and 250° C., substantially free from phenols boiling outside said temperature range to produce a resinous product solid at temperatures up to 80° C. and soluble in fatty oils independently of the presence of any component other than said formaldehyde and said tar acids.

6. A method of making an oil-soluble phenolic resin which comprises reacting from about 0.6 to 0.95 mole of formaldehyde with one mole of tar acid having a boiling point between 225° and 250° C., substantially free from phenols boiling outside said temperature range to produce a resinous product solid at temperatures up to 80° C. and soluble in fatty oils independently of the presence of any component other than said formaldehyde and said tar acids.

7. A method of making an oil-soluble phenolic resin which comprises reacting a methylene-containing substance with tar acids having a boiling point between 225° and 250° C., substantially free from phenols boiling outside said temperature range in the presence of a catalyst no more alkaline than ammonia to produce a resinous product solid at temperatures up to 80° C. and soluble in fatty oils independently of the presence of any component other than said methylene-containing substance and said tar acids.

8. A method of making an oil-soluble phenolic resin which comprises reacting a methylene-containing substance with tar acids having a boiling point between 225° and 250° C., substantially free from phenols boiling outside said temperature range in the presence of an acid catalyst to produce a resinous product solid at temperatures up to 80° C. and soluble in fatty oils independently of the presence of any component other than said methylene-containing substance and said tar acids.

9. A method of making an oil-soluble phenolic resin which comprises reacting a methylene-containing substance with tar acids having a boiling point between 225° and 250° C., substantially free from phenols boiling outside said temperature range in the presence of ammonia to produce a resinous product solid at temperatures up to 80° C. and soluble in fatty oils independently of the presence of any component other than said methylene-containing substance and said tar acids.

10. A method of making an oil-soluble phenolic resin which comprises reacting from about 0.6 to 0.95 mole of formaldehyde with one mole of a trialkylphenol substantially free from other phenols in the presence of a catalyst no more alkaline than ammonia to produce a resinous product solid at temperatures up to 80° C. and soluble in fatty oils independently of the presence of any component other than said formaldehyde and said trialkylphenol.

11. A method of making an oil-soluble phenolic resin which comprises reacting from about 0.6 to 0.95 mole of formaldehyde with one mole of a trimethylphenol substantially free from other phenols in the presence of a catalyst no more alkaline than ammonia to produce a resinous product solid at temperatures up to 80° C. and soluble in fatty oils independently of the presence of any component other than said formaldehyde and said trimethylphenol.

VICTOR H. TURKINGTON.
WILLIAM H. BUTLER.